(12) United States Patent
Depalov et al.

(10) Patent No.: US 9,413,920 B2
(45) Date of Patent: Aug. 9, 2016

(54) SCANNER (71) Applicant: HEWLETT-PACKARD DEVELOPMENT COMPANY, L.P., Houston, TX (US)

(72) Inventors: Dejan Depalov, Boise, ID (US); Jerry Wagner, Boise, ID (US); Eric L. Anderson, Boise, ID (US); Kenneth K. Smith, Boise, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 14/762,584

(22) PCT Filed: Mar. 27, 2013

(86) PCT No.: PCT/US2013/034057
§ 371 (c)(1),
(2) Date: Jul. 22, 2015

(87) PCT Pub. No.: WO2014/158147
PCT Pub. Date: Oct. 2, 2014

(65) Prior Publication Data
US 2015/0358496 A1 Dec. 10, 2015

(51) Int. Cl.
*H04N 1/04* (2006.01)
*H04N 1/028* (2006.01)
*H04N 1/48* (2006.01)

(52) U.S. Cl.
CPC .......... *H04N 1/02895* (2013.01); *H04N 1/028* (2013.01); *H04N 1/02865* (2013.01); *H04N 1/04* (2013.01); *H04N 1/484* (2013.01)

(58) Field of Classification Search
CPC ....... H04N 1/46; H04N 1/2032; H04N 1/203; H04N 1/04; H04N 1/1912; H04N 1/32593; H04N 1/60; H04N 1/6027; H04N 1/40012; H04N 1/484; G03G 15/011; G03G 15/041; G03G 15/5016; G03G 15/60; G03G 2215/00
USPC .......... 358/474, 505, 514, 483, 1.9, 496, 497, 358/1.13, 446, 512, 515, 504, 513, 509, 358/482, 518, 475, 488; 382/115, 14, 165, 382/199, 124, 127, 135, 162, 163, 173, 176, 382/190, 203, 232, 237, 239, 274, 275, 294, 382/299, 304; 348/E5.049, E5.078, E5.079, 348/242, 250
See application file for complete search history.

(56) References Cited

U.S. PATENT DOCUMENTS 3,627,908 A    12/1971    Dailey
4,088,481 A *   5/1978    Ayash ................ G03G 15/0115
                                                                         430/33

(Continued)

FOREIGN PATENT DOCUMENTS

KR     20070001189      1/2007

OTHER PUBLICATIONS

International Searching Authority, The International Search Report and the Written Opinion, Dec. 10, 2013, 9 Pages.

(Continued)

*Primary Examiner* — Negussie Worku
(74) *Attorney, Agent, or Firm* — HP Inc.—Patent Department (57) ABSTRACT

A scanner is disclosed. The scanner captures three exposures for each color scan line. The scanner has a first, second and third light source that each produces a different color of light. The scanner uses the first and second light source for the first exposure. The scanner uses the first and third source for the second exposure. The scanner uses the second and third light source for the third exposure.

13 Claims, 7 Drawing Sheets

(56) References Cited

U.S. PATENT DOCUMENTS

| | | | |
|---|---|---|---|
| 4,945,406 A * | 7/1990 | Cok | H04N 1/60 348/E9.009 |
| 5,043,824 A | 8/1991 | Suzuki | |
| 5,414,529 A * | 5/1995 | Terada | H04N 1/6016 345/600 |
| 5,757,520 A * | 5/1998 | Takashima | H04N 1/486 250/200 |
| 6,009,192 A * | 12/1999 | Klassen | H04N 1/64 382/166 |
| 6,239,829 B1 * | 5/2001 | Curry | H04N 1/40037 347/251 |
| 2002/0030837 A1 * | 3/2002 | Hokoi | H04N 1/401 358/1.9 |
| 2003/0053157 A1 * | 3/2003 | Sakakibara | H04N 1/486 358/514 |
| 2003/0156302 A1 | 8/2003 | Yasuda | |
| 2005/0089069 A1 | 4/2005 | Ozasa et al. | |
| 2005/0117181 A1 * | 6/2005 | Hokoi | H04N 1/0282 358/302 |
| 2006/0181725 A1 * | 8/2006 | Matsuya | H04N 1/56 358/1.9 |
| 2007/0024930 A1 * | 2/2007 | Cai | H04N 1/02815 358/509 |
| 2007/0152129 A1 | 7/2007 | Li et al. | |
| 2007/0200866 A1 | 8/2007 | Lee et al. | |
| 2008/0137148 A1 * | 6/2008 | Oh | H04N 1/40012 358/3.23 |
| 2008/0144133 A1 * | 6/2008 | Smith | H04N 1/40 358/500 |
| 2008/0225102 A1 | 9/2008 | Tomita | |
| 2008/0247670 A1 * | 10/2008 | Tam | G06T 7/0051 382/298 |
| 2010/0165368 A1 * | 7/2010 | Matsuoka | H04N 1/401 358/1.9 |
| 2010/0231929 A1 * | 9/2010 | Kakigi | G06T 3/4007 358/1.2 |
| 2010/0284009 A1 | 11/2010 | Dicarlo et al. | |
| 2011/0013242 A1 * | 1/2011 | Hagio | H04N 1/00002 358/520 |
| 2012/0242714 A1 | 9/2012 | Narimatsu | |
| 2013/0038741 A1 * | 2/2013 | Kovalchuk | G01J 3/2823 348/197 |
| 2013/0329006 A1 * | 12/2013 | Boles | G06F 17/30879 348/42 |

OTHER PUBLICATIONS

Niesten, M. et al., Scanning Laser Beam Displays, (Research Paper), 2008, vol. 7001.

* cited by examiner

SCANNER

BACKGROUND

A scanner is a device used to create a digital image from a printed page, or from a 3-dimensional object, placed on a scanning bed. There are many types of scanners, for example sheet feed scanners, flatbed scanners, stand-alone scanners and scanners integrated into multifunctional printers (MFPs).

DETAILED DESCRIPTION

A scanner is used to create digital images of documents or three-dimensional objects placed on the scanner. Some scanners only capture black and white or grayscale images. Color scanners capture color images from the scanned objects. To describe the color of an object typically requires three different color values or components of a color space. The most commonly used color components are red, green and blue (RGB) of the RGB color space. A color scanner captures the red, green and blue values for each small area in the object being scanned. These small areas are typically called pixels.

There are two general ways to capture the color values for each color component. The first way is for a scanner to use a broadband light source and three different color filters located on top of the sensors. A broadband light source produces light across all three color components. A broadband light source typically produces white light. The broadband light source is used to illuminate a scan area where the object to be scanned is located.

The scanner separates the light into the three color components using the color filters located on top of the sensors that receive the light from the scan area. The scanner may have three rows of sensors with each row covered with a different color filter. One filter will allow red light to pass through to the sensors in that row, the other two rows will have filters that allow green and blue light to pass through respectively. The three rows of sensors are moved with respect to the scan area such that all three sensors capture an image of the object. This allows the scanner to capture the RGB values for each area on the object. This type of scanner produces high quality color images but also requires three different rows of sensors and a broadband light source.

The second way to capture the color values for each color component is to use three differently colored light sources and a single row of broadband sensors. The three color light sources typically produce light over a red, green and blue wavelength band respectively. Typically the light sources are light emitting diodes (LED). The broadband sensor is sensitive to light across all three wavelength bands produced by the three light sources.

In one example, the scanner steps the broadband sensor to a first location and then takes three different exposures using each of the three different color light sources while the sensor remains stationary. The scanner then steps the broadband sensor to the next location and repeats the three exposures. Each set of three exposures makes up a color scan line with three different color values captured for each pixel. This method captures all three color values for each physical location that is scanned.

In another example, the scanner moves the broadband sensor at a constant speed and repeatedly takes three exposures in sequence using the three different light sources. For example a red light is used during the first exposure, a green light is used for the second exposure, and a blue light is used for the third exposure. Each set of three exposures is used to create a color scan line. Because the sensor is moving during the exposures, each physical location on the page is captured using only one of the three light sources. The physical locations captured in each exposure are so small and so close together that combining the three different exposures into one color scan line produces a good color representations of the area scanned.

The speed that the sensor is moved depends on the sensor size, the sensor sensitivity and the amount of light received by the sensor. Each, pixel in the sensor can be compared to a bucket. The time it takes to fill the bucket with light depends on how big the bucket is and the rate at which the light fills the bucket. The more light there is illuminating the object to be scanned, the faster the bucket fills up. When the bucket fills up quickly, the sensor can be moved quickly, resulting in a shorter scan times.

The amount of light illuminating the scan area depends on the power available to drive the light source, the efficiency of the light source, and the maximum power the light source can produce without overheating or degrading. The amount of light reaching the sensor is affected by the optical path (e.g. lenses and mirrors), which determines the effective aperture of the system. The light sources used in this type of scanner are typically three sets of LEDs that produce light over three different wavelength bands. The three different wavelength bands are red, green and blue. Each of the three different sets of LEDs is typically driven at the maximum power the LEDs can handle such that each LED is illuminating the object to be scanned with the maximum amount of light the LED can produce without overheating or degrading. The amount of illumination produced by an LED may vary dependent on the color of light produced. The scan speed is limited by the color of LED with the least amount of illumination. Therefore, scanners that use only one color of light for each exposure have a limited scan speed.

In one example, the amount of light illuminating the object to be scanned is doubled by using two of the three sets of LEDs for each exposure. The first exposure for each color scan line would use the LEDs that produce both the red wavelength band of light and the green wavelength band of light. The second exposure for each color scan line would use the LEDs that produce both the blue wavelength band of light and the green wavelength band of light. The third exposure for each color scan line would use the LEDs that produce both the red wavelength band of light and the blue wavelength band of light. By doubling the amount of light illuminating the scan area, the buckets fill up twice as fast, thereby cutting the scan time in half.

Figure 1:
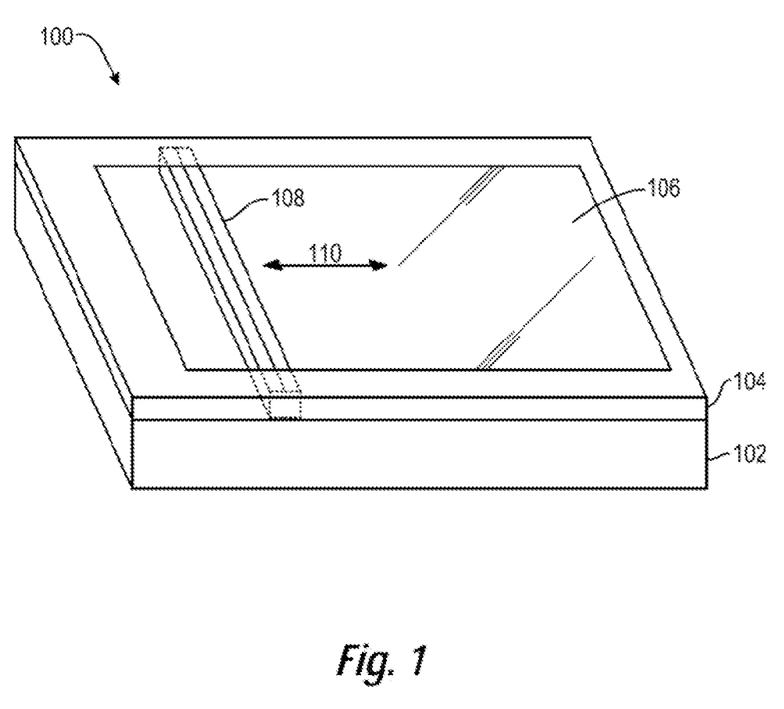
FIG. 1 is an isometric view of an example flatbed scanner 100.

FIG. 1 is an isometric view of an example flatbed scanner 100. Flatbed scanner 100 comprises a scanner base 102, a top bezel 104, a scan platen 106 and a scan head 108. Scanner base 102 is generally a hollow rectangular box that supports the scan platen 106 around its edges. Top bezel 104 fits on top of the scan platen 106 and attaches to the scanner base 102 thereby holding the scan platen 106 in place. The scan platen 106 is fabricated from a transparent material, for example glass. The top surface of the scan platen forms a flatbed scan area. Scanner base 102 also supports a drive system (not shown for clarity) that moves the scan head 108 along the underside of the scan platen 106 (as shown by arrow 110).

Flatbed scanner 100 moves the scan head 108 relative to objects placed on the flatbed scan area. Sheet feed scanners keep the scan head stationary and move pages past the scan head using an automatic document feeder (ADF). The scan area for a sheet feed scanner is located adjacent the scan head where an image of the scan sensor intersects with the paper path of the ADF.

Figure 2:
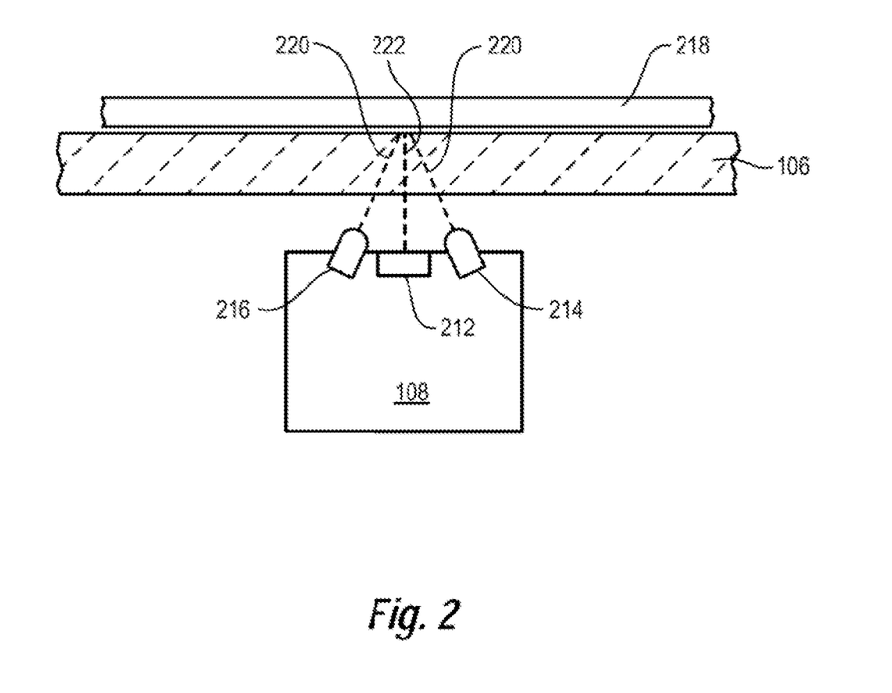
FIG. 2 is an example close-up sectional view of a portion of a scanner 100.

FIG. 2 is an example close-up sectional side view of scanner 100. FIG. 2 shows scan head 108 positioned under scan platen 106. A page 218 is located on the top surface of scan platen 106 in the flatbed scan area. Scan head 108 comprises a sensor 212 and a plurality of light sources. One row of light sources 216 run along the left side of the sensor 212 and another row of light sources 214 run along the right side of the sensor 212. In other examples there may be only one row of light sources. The light sources (214 and 216) and sensor 212 are not to scale and have been enlarged for clarity. Light sources 216 and 214 direct light (as shown by arrows 220) towards the scan area located on top of scan platen 106 and on the underside of the page 218. Light from the page 222 is received by sensor 212 and is converted into an electrical signal.

Figure 3:
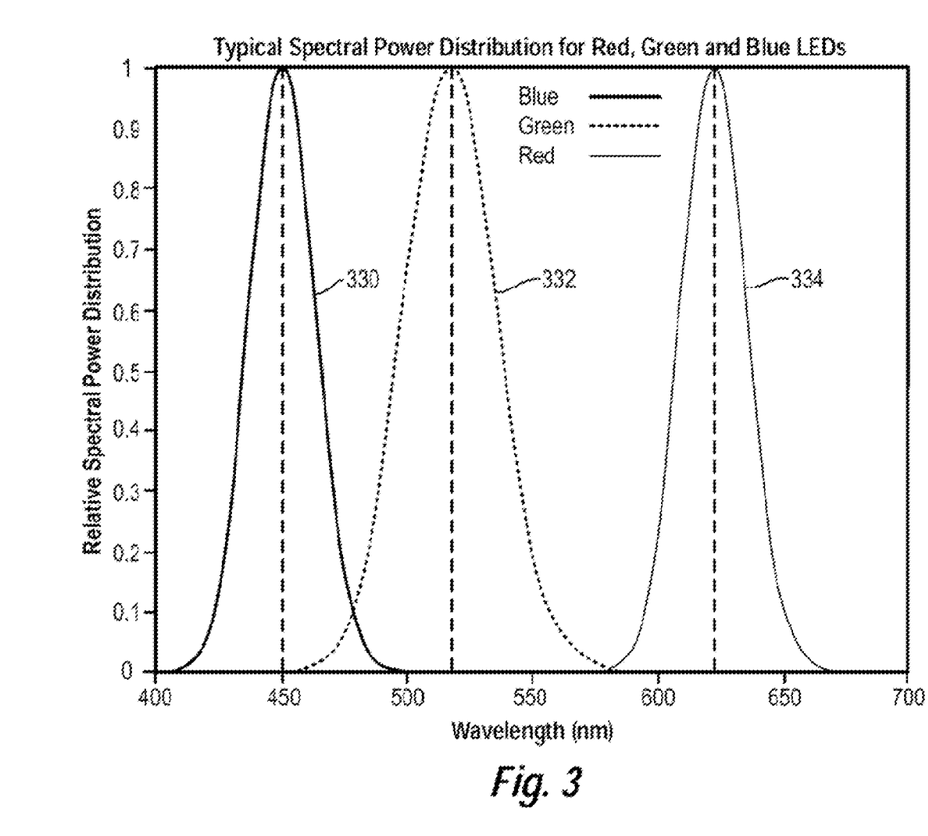
FIG. 3 is an example plot of the light emitted from the three differently colored LEDs.

In one example the light sources (214 and 216) comprise three different colors of light emitting diodes (LEDs), for example red, green and blue. Each row of light sources (214 and 216) have a repeated sequence of LED colors running along sensor 212, for example a red LED, then a green LED and then a blue LED, then the sequence starts over with another red LED. In yet another example, the light source may comprise a single LED of each color and the light from each LED is spread out along the scan line using optical components, for example mirrors or light guides. FIG. 3 is an example plot of the light emitted from the three differently colored LEDs. The vertical axis is the relative power distribution and the horizontal axis is the wavelength of the light emitted.

Line 330 is the plot of power vs. wavelength for a first LED color. Line 330 has a peak around 450 nm and is a blue LED. Line 332 is the plot of power vs. wavelength for a second LED color. Line 332 has a peak around 520 nm and is a green LED. Line 334 is the plot of power vs. wavelength for a third LED color. Line 334 has a peak around 625 nm and is a red LED.

During operation, all the LEDs (in each row) of two different colors are used to illuminate the page for each of three different exposures. For example, all the red LEDs and all the green LEDs are used for a first exposure. All the red LEDs and all the blue LEDs are used for a second exposure. And all the green LEDs and all the blue LEDs are used for a third exposure. Because two sets of LEDs with two different colors are used for each exposure, twice the amount of light is directed towards the underside of page 218 as compared with only using one set of LEDs of a single color. This allows the exposure time for each exposure to be half of the exposure time if only one set of LED of a single color is used.

Combining red and blue light creates magenta light. Combining red and green light creates yellow light. Combining blue and green light creates cyan light. Because the sensor is a broad band sensor, when using two of the three RGB lights for each exposure, the scanner captures the image with a value for cyan, magenta, and yellow (CMY) instead of RGB.

Color values for the components of one color space can be converted to the color values of other color spaces. For example the CMY color values can be converted into RGB values. Converting CMY into RGB can be done using the following simple equations:

$$Red = magenta + yellow - cyan$$

$$Green = cyan + yellow - magenta$$

$$Blue = cyan + magenta - yellow$$

Translating or converting from one color space to another color space can also be done by converting the CMY color values into a standard color model and then converting the color values from the standard color model into the RGB color space. There are a number of standard color models, for example the International Commission on Illumination (CIE) LAB space and CIE XYZ space.

In one example, the CMY color values created by the broadband sensor in the scanner would be converted into the CIE XYZ standard model and then the CIE XYZ values would be converted into the RGB color space. This would allow the scanner to produce color image files in the RGB color space at twice the speed compared to scanning using only one of the RGB light sources for each exposure. Converting CMY color values into CIE XYZ space (with D65 white point) can be done using the following matrix transform:

$$[X] \ [0.1255 \ 0.2353 \ 0.5897] \ [C]$$

$$[Y] = [0.5747 \ -0.4303 \ 0.8557] * [M]$$

$$[Z] \ [1.0502 \ 0.8504 \ -0.8118] \ [Y]$$

Once the CMY values are in CIE XYZ color space they can be converted into RGB color space. CIE XYZ values can be transformed to RGB space via a 3×3 matrix tensions. To transform from XYZ to RGB (with D65 white point), the matrix, transform used is:

$$[R] \ [3.2405 \ -1.5371 \ -0.4985] \ [X]$$

$$[G] = [-0.9693 \ 1.8760 \ 0.0416] * [Y]$$

$$[b] \ [0.0556 \ -0.2040 \ 1.0572] \ [Z].$$

Once the color data has been converted into RGB space, the data can be saved as color image files or displayed on a screen. In one example the conversion from one color space to another color space may be done in the scanner using hardware, or a combination of hardware and firmware. Firmware is the code running inside the scanner that controls and operates the scanner. In another example the scanner would output the image using values in the CMY color space and another device would do the color conversion, for example a computer.

Printers typically convert RGB data from image files into CMY or CMYK data to drive their print engine, where K represents black. This is because printers typically use inks that are cyan, magenta, yellow and black in color, and not red, green and blue in color. In some examples, the scanner would not convert the CMY color data into RGB color data. Instead the scanner would output the CMY data directly to the printer for use by the printer. In some examples the printer may convert the CMY data into CMYK data, or the scanner could do the conversion and output CMYK data.

Converting CMY data into CMYK data can be done in a number of ways. One method divides the CMY values into a black component (determined by the minimum value among C, M and Y), and the relative proportions of C, M and Y within the remaining colored component (see equations below)

Black (K)=minimum of C,M,Y $Cyan_{CMYK}=(C-K)/(1-K)$ $Magenta_{CMYK}=(M-K)/(1-K)$ $Yellow_{CMYK}=(Y-K)/(1-K)$ Using this method one of the C, M or Y values is therefore always zero. Another method that can take into account the specific inks used, converts the CMY data into a standard color model like CIE XYZ or CIE LAB space. Then convert the standard color model data into CMYK space.

In some examples the scanner may be integrated into a multi-functional peripheral (MFP). MFPs are devices that typically contain a printer and an imaging device, typically a scanner. The printer and scanner can operate separately or together to function as a copier, a printer, a FAX machine, a scanner and the like. MFPs are also known as all-in-one (AiO) devices, multi-function devices (MFD), and the like.

Figure 4:
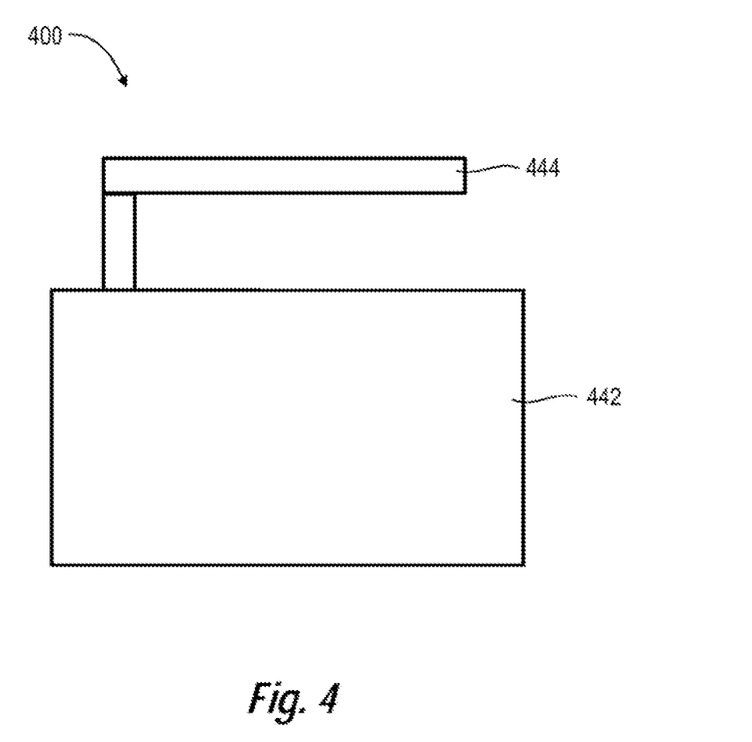
FIG. 4 is a side view of an example multi-functional peripheral (MFP).

FIG. 4 is a side view of an example MFP. MFP 400 comprises a scanner 444 and a printer 442. The scanner 444 is attached to the top of the printer 442 and integrated together to form one MFP device. Data can be passed between the scanner 444 and the printer 442. In some examples, an automatic document feeder (ADF) may be attached to, or integrated with scanner 444 (not shown for clarity). When the ADF is integrated with the scanner it is considered part of the scan engine.

Figure 5:
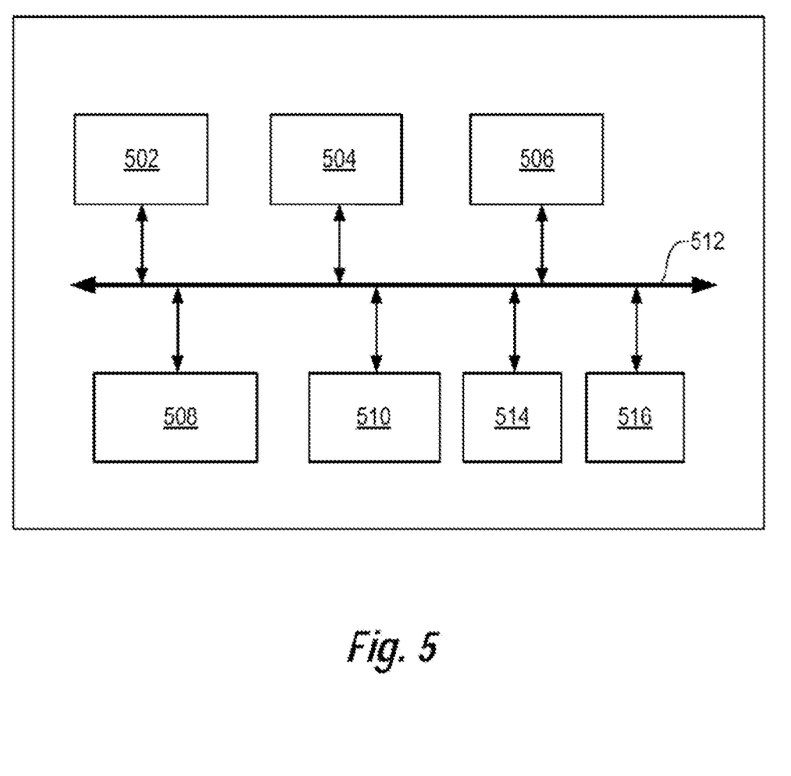
FIG. 5 is an example block diagram of an MFP.

FIG. 5 is an example block diagram of an MFP. MFP comprises a processor 502, memory 504, input/output (I/O) module 506, display 508, controller 510, scan engine 514 and print engine 516 all coupled together on bus 512. In some examples MFP may also have a user interface module, an input device, and the like, but these items are not shown for clarity. Processor 502 may comprise a central processing unit (CPU), a micro-processor, an application specific integrated circuit (ASIC), or a combination of these devices. Memory 504 may comprise volatile memory, non-volatile memory, and a storage device. Memory 504 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 506 is used to couple MFP to other devices, for example the Internet or a computer. MFP has code, typically called firmware, stored in the memory 504. The firmware is stored as computer readable instructions in the non-transitory computer readable medium (i.e., the memory 504). Processor 502 generally retrieves and executes the instructions stored in the non-transitory computer-readable medium to operate the MFP and to execute functions. In one example, processor executes code that scans an image with the scanner.

Figure 6:
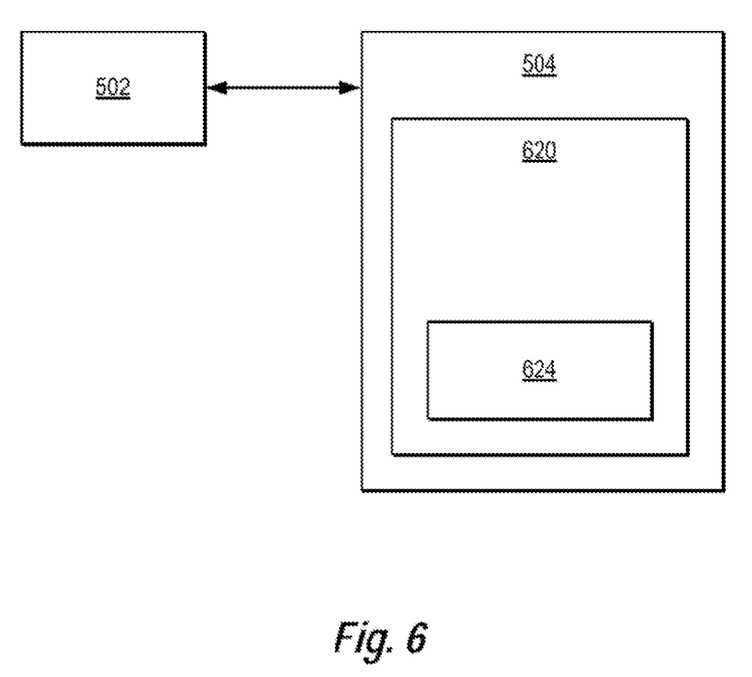
FIG. 6 is an example block diagram of the processor 502 coupled to memory 504.

FIG. 6 is an example block diagram of the processor 502 coupled to memory 504. Memory 504 contains firmware 620. Firmware 620 contains a scan module 624. The processor 502 executes the code in scan module 624 to scan an image with the scanner.

Figure 7:
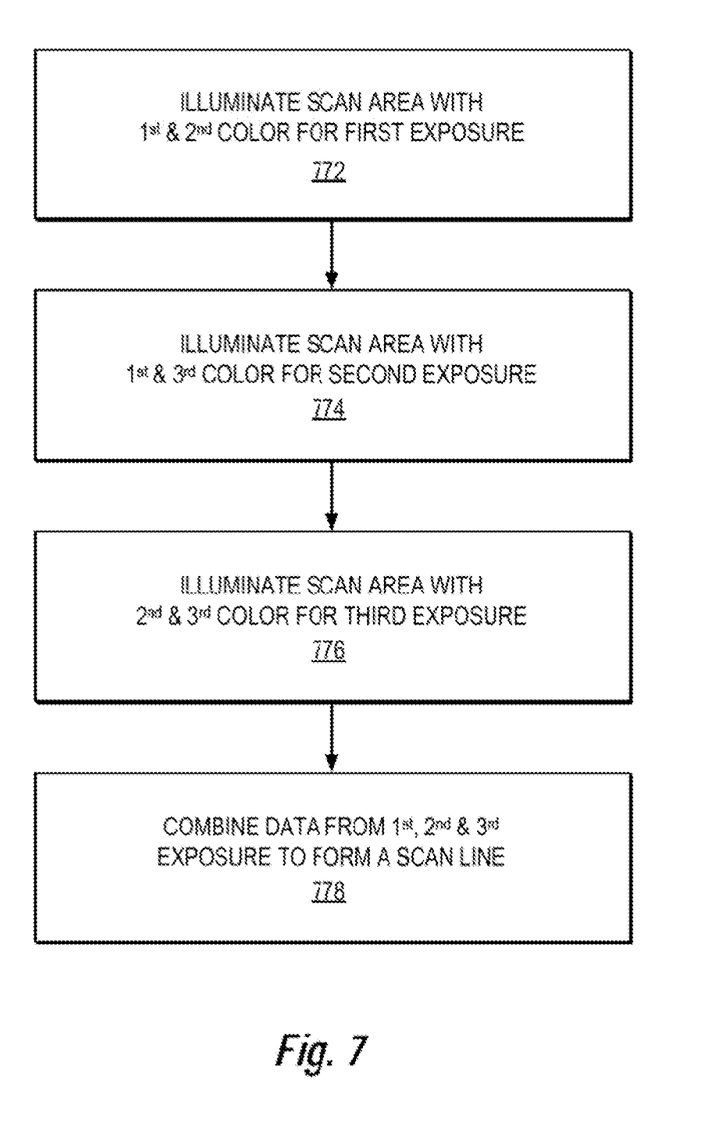
FIG. 7 is an example flow chart for scanning.

FIG. 7 is an example flow chart for scanning. Flow starts at 772 where a scan area is illuminated using a first and second color of light to capture a first exposure. At 774 the scan area is illuminated using the first and a third color of light to capture a second exposure. At 776 the scan ares is illuminated using the second and third color of light to capture a third exposure. At 778 the data from the first, second, and third exposure are combined to form a color scan line. Once the scan has been generated it can be saved or displayed. In some examples the first, second and third colors of light are in a first color space and the data captured for each exposure is in a second, different color space. For example, the first color space may be the RGB color space and the second color space may be the CMY color space.

The conversion between the first color space and the second color space may be done with firmware, a combination of hardware and firmware, or in hardware. The hardware may be located in the scanner or in other parts of an MFP, for example in the printer.

The scanners described above use three different colors of light to illuminate the scan area. In other examples the scanner may use more than 3 different colors. For example, some scanners use 6 different colors of light to illuminate the scan area. For example, a scanner may use "deep red" (650 nm peak), red (625 nm peak), "lime green" (570 nm peak), green (520 nm peak), blue (450 nm peak), and "royal blue" (440 nm peak) light to illuminate the scan area, one color for each exposure. By using 6 different colors of light the color gamut captured by the scanner can be broadened. A 6 color scanner can also use more colors of light for each exposure to increase the amount of light illuminating the scan area. For example, a 6 color scanner will use the following combinations of light colors for each exposure: deep red and lime green light for a first exposure, deep red and blue light for a second exposure, lime green and blue light for a third exposure, red and green light for a fourth exposure, red and royal blue light for a fifth exposure, and green and royal blue light for a sixth exposure.

What is claimed is:

1. A scanner, comprising:
a first light source that produces light of a first color;
a second light source that produces light of a second color, different than the first color;
a third light source that produces light of a third color, different than the first and second colors;
the three light sources positioned to direct light onto a scanning area;
a broadband sensor to receive light from the scanning area: and
a controller coupled to the three light sources and the broadband sensor to control the capturing of a sequence of exposures;
the controller to use the first and second light sources for a first exposure;
the controller to use the first and third light sources for a second exposure;
the controller to use the second and third light sources for a third exposure where a color scan line comprises data from the first, second and third exposures,
wherein the controller converts data from the first, second and third exposures from a first color space into a second color space before saving the data as a color scan line.

2. The scanner of claim 1, where the first light source produces light over a red wavelength band, the second light source produces light over a green wavelength band and the third light source produces light over a blue wavelength band.

3. The scanner of claim 1, where the first color space is cyan, magenta and yellow (CMY) and the second color space is red, green and blue (RGB).

4. The scanner of claim 1, where the first light source comprises a plurality of red light emitting diodes (LEDs), the second light source comprises a plurality of green LEDs, and the third light source comprises a plurality of blue LEDs.

5. The scanner of claim 1, further comprising:
a printer integrated with the scanner to form a multi-functional peripheral (MFP), where the printer is coupled to the controller.

6. The scanner of claim 5, wherein the printer is to receive a plurality of color scan lines from the controller and where the data from the first, second and third exposures for each of the plurality of color scan lines is in either cyan, magenta and yellow (CMY) color space or cyan, magenta, yellow and black (CMYK) color space.

7. The scanner of claim 1, wherein the seamier is of a type selected from the group, a flatbed scanner, a sheet feed scanner.

8. The scanner of claim 1, further comprising:
a fourth light source that produces light of a fourth color, different than the first, second and third color;
a fifth light source that produces light of a fifth color, different than the first, second, third and fourth color;
a sixth light source that produces light of a sixth color, different than the first, second, third, fourth and fifth color;
the 6 light sources positioned to direct light onto the scanning area;
the controller coupled to the 6 light sources;
the controller to use the fourth and fifth light sources for a fourth exposure;
the controller to use the fourth and sixth light sources for a fifth exposure;
the controller to use the fifth and sixth light sources for a sixth exposure where a color scan line comprises data from the first, second, third, fourth, fifth and sixth exposures.

9. A method of scanning, comprising:
illuminating a scan area with light of a first and second color in a first color space to capture a first color in a second color space for a first exposure;
illuminating the scan area with light of a first and third color in the first color space to capture a second color in the second color space for a second exposure;
illuminating the scan area with light of a second and third color in the first color space to capture a third color in the second color space for a third exposure;
converting the data from the first, second and third exposures from the second color space into the first color space; and
combining data from the first, second and third exposures into a color scan line and saving the color scan line to memory.

10. The method of scanning of claim 9, where the first color space is RGB color space.

11. The method of scanning of claim 9, where the second color space is CMY color space.

12. The method of scanning of claim 9, further comprising:
sending the color scan line to a printer, wherein the scan area is in a scanner and the printer is integrated with the scanner to form a multi-functional peripheral (MFP).

13. A non-transitory computer readable medium containing computer instructions that, when executed by a processor, scans an image, comprising:
capturing a first exposure of an object using a broadband sensor while illuminating the object with red and blue light;
capturing a second exposure of the object using the broadband sensor while illuminating the object with red and green light;
capturing, a third exposure using, the broadband sensor while illuminating the object with green and blue light;
converting the data from the first, second and third exposures from a second color space into a first color space; and
combining data from the first, second and third exposures into a color scan line.

* * * * *